May 6, 1958 C. C. HAAS ET AL 2,833,232
HIGH SPEED PLANTER MECHANISM
Filed July 2, 1956 2 Sheets-Sheet 2
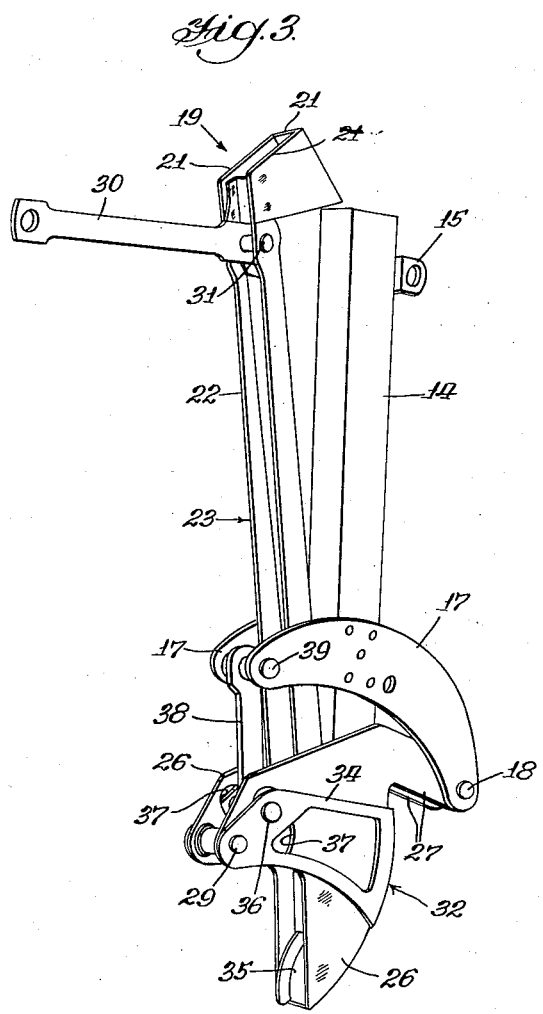
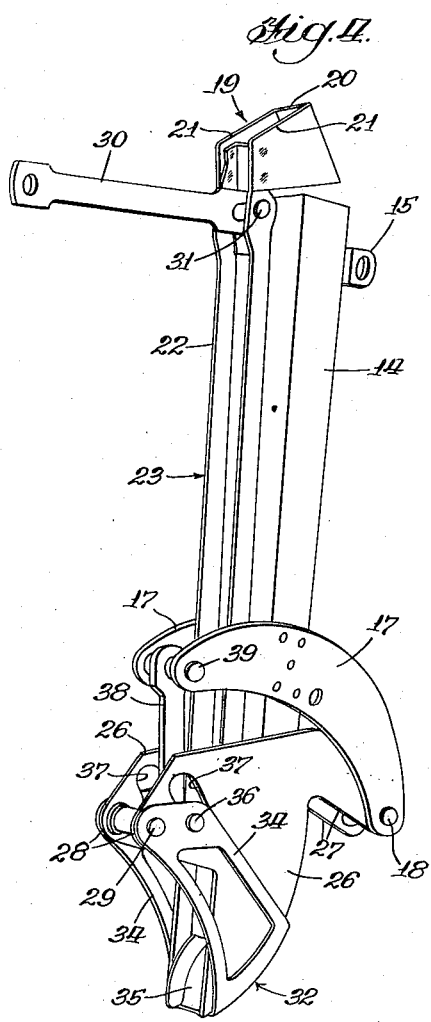
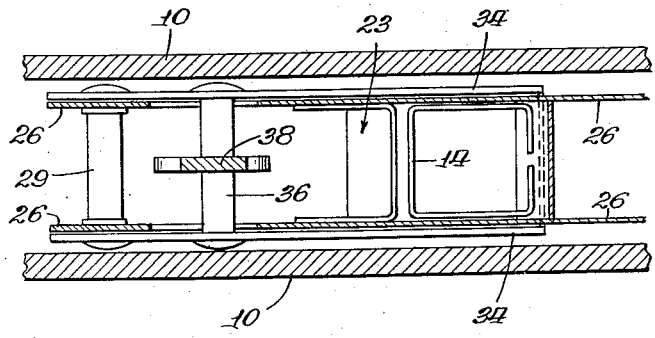
INVENTORS.
Clarence C. Haas
Robert H. Vance
Paul O. Pippel
Atty.

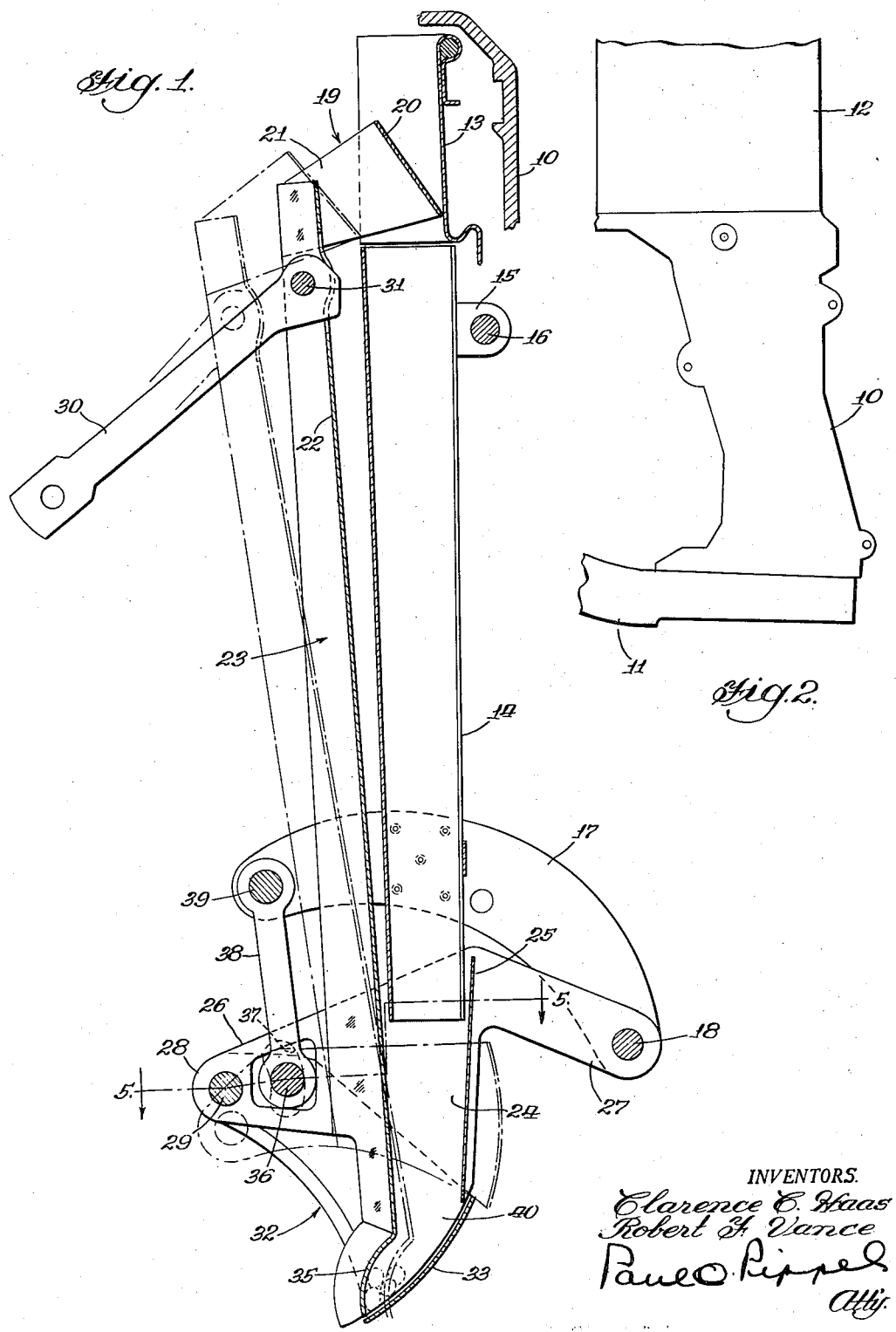

United States Patent Office 2,833,232
Patented May 6, 1958

2,833,232

HIGH SPEED PLANTER MECHANISM

Clarence C. Haas and Robert F. Vance, Richmond, Ind., assignors to International Harvester Company, a corporation of New Jersey Application July 2, 1956, Serial No. 595,542

8 Claims. (Cl. 111—51)

This invention relates to agricultural implements and particularly to seeders, planters and the like. More specifically the invention concerns seed depositing apparatus used in conjunction with a furrow former or the like, and improved means for regulating the discharge of seed into the furrow.

In a corn planter or the like, seed carried in a hopper mounted on a traveling support such as a tractor or a wheeled planter frame is released from the hopper to fall by gravity through a furrow opener boot to the furrow formed by the furrow opening tool.

It is customary to provide a guide or tube within the boot to guide and confine the seed as it falls, and for planting in hills where a selected number of seeds are accumulated and periodically deposited, a gate or valve is provided at the upper and lower ends of the boot to operate in conjunction with the seed tube to catch the seed and discharge it periodically into the furrow made by the furrow opening tool. In modern high speed planting difficulty is encountered in causing the seed accumunlated at the bottom of the boot to be discharged into the furrow in such a way as to form a tight, compact pattern.

The present invention has for its object the provision of improved means for controlling the passage of seed through the furrow opener boot to the ground.

Another object of the invention is the provision of improved means for ejecting seed from a planter boot into the furrow made by the furrow forming tool.

Another object of the invention is a provision of improved seed accumulating and ejecting means for a planter, in the form of a receptable in the lower end of the furrow opener boot for accumulating seed and having a gate controlled outlet through which seed is discharged, the receptable being rockable to throw out the seed and the gate being reciprocable to and from a position closing the outlet.

Another object of the invention is the provision of a planter including a furrow opener boot having a guideway therein to confine seed falling therethrough, a rockable gate-carrying member at the lower end of the guideway and a closure member at the upper end of the guideway carried by and movable with the rocking of said rockable member for arresting seed falling from the receptacle.

Other objects and advantages of the invention will become clear from the following detailed description when read in conjunction with the accompanying drawings wherein:

Figure 1 is a sectional view in side elevation on an enlarged scale showing the seed guiding and discharging apparatus within the furrow opener boot;

Figure 2 is a schematic side elevation of a portion of a planter showing the relationship of the seed hopper, boot, and furrow opener;

Figure 3 is a perspective view on a scale smaller than that of Figure 1, showing the seed tube and valve apparatus separated from the furrow opener boot, and with the upper and lower gates or valves in the open position;

Figure 4 is a view in perspective similar to Figure 3, but showing the gates or valves in closed position; and Figure 5 is a section taken on the line 5—5 of Figure 1.

Referring to the drawings, the operating apparatus for planting seed shown in Figures 1, 3 and 4 is enclosed in the boot housing 10 illustrated schematically in Figure 2. For purposes of this invention it may be understood that the furrow opening tool 11 at the lower end of the boot and the means for releasing seed or other material from the hopper 12 at the upper end of the boot form no part of the present invention and may be of any well known type. However, it should be understood that seed released from the container 12 is received in the passageway 13 at the upper end of the boot and is discharged into an elongated vertically extending tubular guideway 14, square in cross-section, which is secured by lugs 15 and a bolt 16 to the housing 10. Tube 14 is tapered somewhat downwardly and is affixed near its lower end to the central portion of a pair of arcuately shaped plates 17 on opposite sides of the tube and which are, in turn, mounted upon a pivot pin 18 carried by the housing 10. Except for the possible looseness of connections 16 and 18, seed tube 14 is held substantially stationary in the planter boot.

Corn planted by the hill drop method is discharged, one kernel at a time from the seed cells of a conventional seed plate rotatably mounted at the base of the hopper 12, and not shown. In order that a predetermined number of kernels of corn may be dropped in spaced hills in the furrow formed by the earth working tool 11, means are provided for accumulating the required number of kernels and periodically discharging them to the ground. In order to facilitate passage of the seed through tube 14 with a minimum of agitation thereof the seed is arrested at the entrance to the tube 14 by the provision of a valve or gate 19 which is U-shaped, having a transverse gate portion 20 forming, in closed position, an angle with the wall of passageway 13, as indicated in Figure 1, and having arms 21 affixed to the upper end of an elongated, channel-shaped lever like arm 22 lying alongside and generally coextensive with the tube 14, and forming part of a rockable member 23.

Rockable member 23 includes at its lower end a receptacle portion 24 slidably receiving the lower end of seed tube 14, the forward wall of the receptacle being formed by the lower end of lever arm 22, a short upwardly diverging member 25 forming the rear wall, and laterally spaced plates 26 the side walls.

Plates 26 are provided with spaced rearwardly projecting lugs 27 swingably mounted upon the pivot pin 18 and forwardly extending projections 28 having mounted therebetween a pivot pin 29.

At this point it should be clear that the rockable member 23 and its receptacle 24 can be swung about the axis of pin 18 from the solid line to the dotted line position of Figure 1, or between the positions shown in Figures 3 and 4. Lever arm 22 is swung to rock the member 23 through the intermediary of an actuating member in the form of a link 30 pivotally connected to a pin 31 carried at the upper end of arm 22 and actuated by conventional planter operating means, not shown.

A U-shaped gate or valve member 32 is provided with a transverse arcuately shaped gate portion 33 and laterally spaced arms 34 pivotally mounted at their upper ends upon pin 29.

Seed passing through the tube 14 is received in the receptacle 24 and, as shown in Figure 1, a pocket of seed is caught between the gate 33, forming the base of the receptacle 24, and a convexly curved toe portion 35 at the lower end of the forward wall formed by the lever arm portion 22.

A pocket of seeds such as indicated in Figure 1 is periodically caught at the base of the receptacle 24 and is released by reciprocation of gate 33 from the solid line to the dotted line position of Figure 1 or between the positions of Figures 3 and 4. At the same time the valve or gate member 33 moves to the dotted line position such as indicated in Figure 1, the rockable member 23 is also rocked to the dotted line position of Figure 1 and thus acts to forceably eject the seed into the furrow formed by the earth penetrating tool 11.

Reciprocation of gate member 33 occurs with the rocking of member 32, and this is accomplished by the provision of another pivot pin 36 mounted between the arms 34 at a location spaced from pin 29 and extending through slots 37 formed in plates 26. To the pin 36, between arms 26, is pivotally connected the lower end of a link 38, the upper end of which is pivotally mounted upon a pin 39 carried between the forwardly projecting ends of the arcuately shaped plates 17, which straddle the rockable member 23.

Since tube 14 is substantially stationary and since plates 17 are affixed thereto and mounted upon pin 18 carried by the housing 10, the pin 39 serves as a reaction point for link 38 equivalent to a reaction point on the housing itself. Thus, by actuating link 30 and lever arm 22 to rock the rockable member 23 about the axis of pin 18, valve 32 is reciprocated to and from a position over the opening 40 at the lower end of receptacle 24, and seed accumulated as shown is ejected, by the action of these parts, into the furrow.

In operation, seed released from the hopper 12 is caught by the gate 20 at the upper end of tube 14 and mounted upon the upper end of lever arm 22. Gate 20 is thus integral with the lever arm 22 and is swung simultaneously with gate 33 to and from a position closing the upper end of tube 14 and the discharge outlet in receptacle 24. For example, as shown in Figure 3, upper gate 20 and lower gate 33 are both in the open position, and in Figure 4 they are both in the closed position.

It is believed that the operation of the novel planter control apparatus of this invention should be clearly understood from the foregoing description. It should likewise be understood, however, that the invention has been described in its preferred embodiment only, and that modifications may be made in the invention without departing from the spirit thereof or the scope of the appended claims.

What is claimed is:

1. In a planter including a housing and a generally vertical seed tube substantially stationarily mounted in the housing having openings in the top and bottom thereof for the passage of seed therethrough, valve means associated with the opening in the bottom of said tube to control the discharge of seed comprising a rockable member pivotally mounted on the housing having an opening therein to slidably receive the lower end of said tube and a discharge outlet, a gate member pivotally mounted on the lower portion of said rockable member at a location spaced from the latter's pivot in the housing for swinging relative to the rockable member to and from a position closing said discharge outlet, link means connected to said housing and to said gate member operative to react against said housing and swing said gate in response to the rocking of said rockable member, and actuating means operatively connected to said rockable member for rocking the latter.

2. The invention set forth in claim 1, wherein an elongated member operatively connected to said actuating means and forming a part of said rockable member extends vertically alongside said tube and serves as a lever for rocking the rockable member.

3. The invention set forth in claim 2, wherein the upper end of said elongated member swings toward and away from said seed tube, and said elongated member carries a closure member which moves with the elongated member to and from a position closing the opening in the top of said tube.

4. In a planter including a vertically elongated housing, a guideway substantially stationarily mounted in the housing adapted to receive at its upper end seed and the like and guide it in its downward path toward the ground, a rockable member associated with the lower end of said guideway including a receptacle portion for the seed from said guideway and having an outlet, means pivotally mounting said rockable member on said housing for swinging movement with respect thereto, an actuating member operatively connected to said rockable member for rocking the latter, a valve gate pivotally mounted on the lower portion of said rockable member at a location spaced from the latter's pivot in said housing, and means operatively connected to said gate for swinging the latter relative to said rockable member between open and closed positions with respect to said outlet in response to rocking of said rockable member for periodically discharging material in said receptacle portion.

5. In a planter including a vertically elongated housing, a guideway substantially stationarily mounted in the housing adapted to receive at its upper end seed and the like and guide it in its downward path toward the ground, a rockable member associated with the lower end of said guideway including a receptacle portion for the seed from said guideway and having an outlet, means pivotally mounting said rockable member on said housing for swinging movement with respect thereto, an actuating member operatively connected to said rockable member for rocking the latter, a valve gate pivotally mounted on the lower portion of said rockable member at a location spaced from the latter's pivot in the housing, means operatively connected to said gate for swinging the latter relative to the rockable member between open and closed positions with respect to said outlet in response to rocking of said rockable member for periodically discharging material in said receptacle portion, and a closure member carried by said rockable member and movable therewith to and from a position closing the upper end of said guideway.

6. In a planter including a vertically elongated housing, a guideway substantially stationarily mounted in the housing adapted to receive at its upper end seed and the like and guide it in its downward path toward the ground, a rockable member associated with the lower end of said guideway including a receptacle portion for the seed from said guideway and having an outlet, means pivotally mounting said rockable member on said housing for swinging movement with respect thereto, an actuating member operatively connected to said rockable member for rocking the latter, a valve gate pivotally mounted on the lower portion of said rockable member at a location spaced from the latter's pivot in the housing, and means operatively connected to said gate for swinging the latter relative to the rockable member between open and closed positions with respect to said outlet in response to rocking of said rockable member for periodically discharging material in said receptacle portion, said last mentioned means comprising a link operatively connected to said housing and to said valve gate and actuated by the rocking of said rockable member to swing said gate.

7. The invention set forth in claim 5, wherein said guideway is an independent stationary seed tube secured to the housing and said rockable member includes a lever arm portion substantially coextensive with said tube.

8. The invention set forth in claim 7, wherein said closure member is affixed to the upper end of said lever arm portion and moves with the rocking of said member to and from a position closing the upper end of said tube.

References Cited in the file of this patent

UNITED STATES PATENTS

| 1,951,458 | White | Mar. 20, 1934 |
| 2,340,163 | White | Jan. 25, 1944 |
| 2,648,301 | White | Aug. 11, 1953 |